United States Patent
Mitomo et al.

(10) Patent No.: US 6,352,343 B1
(45) Date of Patent: Mar. 5, 2002

(54) GAS PERMEABLE HARD CONTACT LENS AND METHOD OF PRODUCING IT

(75) Inventors: Kikuo Mitomo; Tohru Shirafuji; Hideo Suda; Teruhisa Shimizu; Yuichi Yokoyama, all of Tokyo (JP)

(73) Assignee: Hoya Healthcare Corporation, Tokyo (JP)

( * ) Notice: Subject to any disclaimer, the term of this patent is extended or adjusted under 35 U.S.C. 154(b) by 0 days.

(21) Appl. No.: 09/462,515

(22) PCT Filed: Apr. 30, 1999

(86) PCT No.: PCT/JP99/02319

§ 371 Date: Jan. 14, 2000

§ 102(e) Date: Jan. 14, 2000

(87) PCT Pub. No.: WO99/58318

PCT Pub. Date: Nov. 18, 1999

(30) Foreign Application Priority Data

May 8, 1998 (JP) .......................................... 10-126458

(51) Int. Cl.⁷ .......................... G02C 7/02; G02C 7/04; B29D 11/00
(52) U.S. Cl. ........................ 351/177; 351/160 R; 264/2.7
(58) Field of Search ............................. 351/177, 160 R, 351/161, 162; 264/2.7, 1.1

(56) References Cited

U.S. PATENT DOCUMENTS

| | | | |
|---|---|---|---|
| 4,084,459 A | 4/1978 | Clark | 82/1.11 |
| 4,197,266 A | 4/1980 | Clark et al. | 264/2.2 |
| 4,400,333 A | 8/1983 | Neefe | 264/2.7 |
| 4,433,125 A | 2/1984 | Ichinohe et al. | 526/279 |
| 4,582,884 A | 4/1986 | Ratkowski | 526/279 |
| 4,652,622 A * | 3/1987 | Friends et al. | 526/279 |
| 5,512,205 A * | 4/1996 | Lai | 252/182.14 |
| 5,876,441 A | 3/1999 | Shibuya | 623/6.56 |
| 5,925,294 A | 7/1999 | Shibuya | 264/2.7 |
| 6,180,031 B1 * | 1/2001 | Bawa et al. | 264/1.1 |

FOREIGN PATENT DOCUMENTS

| | | |
|---|---|---|
| JP | 60-49906 | 3/1985 |
| JP | 61-41118 | 2/1986 |
| JP | 63-85719 | 4/1988 |
| JP | 4-67117 | 3/1992 |
| JP | 7-62022 | 3/1995 |

* cited by examiner

*Primary Examiner*—Jordan M. Schwartz
(74) *Attorney, Agent, or Firm*—Nixon & Vanderhye (57) ABSTRACT

Gas-permeable hard contact lenses are produced by hot press-stretching a crosslined gas-permeable hard contact lens material and then machining the press-stretched material. The gas-permeable hard contact lenses are formed from a crosslinked gas permeable hard contact lens material which is hot press-stretched to have a compression ration of 5 to 50% and a compression-flexure fracture strength of 300 to 1,500 g. Efficiently produced gas-permeable hard contact lenses are produced which are free of optical strains, excellent in transparency, small internal stress and comfortable to wear with improved durability strength.

20 Claims, 3 Drawing Sheets

GAS PERMEABLE HARD CONTACT LENS AND METHOD OF PRODUCING IT

TECHNICAL FIELD

The present invention relates to a process for the manufacture of a gas-permeable hard contact lens and a gas-permeable hard contact lens. More specifically, it relates to a process for efficiently producing a gas-permeable hard contact lens having excellent durability strength and a gas-permeable hard contact lens which is improved in durability strength and free of optical strains and which has no problem on wearing.

TECHNICAL BACKGROUND

A contact lens is generally classified into a hard contact lens and a soft contact lens. Further, the hard contact lens is classified into an oxygen-non-permeable hard contact lens formed of a homopolymer or copolymer of methyl methacrylate (MMA) and a rigid gas permeable (RGP) hard contact lens formed of a copolymer formed of siloxanyl methacrylate (SiMA), MMA and fluoroalkylmethacrylate (FMA) as main components.

In the beginning, the main stream of a hard contact lens was an oxygen-non-permeable hard contact lens formed of polymethyl methacrylate (PMMA) having excellent biocompatibility and excellent transparency. Concerning the above oxygen-non-permeable hard contact lens, however, as contact lenses have come to be used widely, damage is caused on corneal epithelium since the wearing time period thereof is extended, or influences which the long wearing time period thereof has on cells of corneal endothelium have come to be discussed. Hard contact lenses with more safety have come to be developed.

The gas-permeable hard contact lens is a hard contact lens developed under the above circumstances, and it is classified into a low-oxygen-permeable type and a high-oxygen-permeable type depending upon an oxygen permeability coefficient (DK value). In present markets, the main stream is a high-oxygen-permeable type (continuous-wearing contact lens) due to a further extended wearing time period.

Since, however, the gas-permeable hard contact lens has molecular-level holes for allowing oxygen gas necessary for cornea wearing the contact lens to permeate therethrough and exhausting metabolically generated carbon dioxide gas, it has a defect that its durability strength against an instantanious impact or bending decreases inevitably with an increase in the DK value.

For overcoming the above defect, there is proposed an oxygen-permeable hard contact lens which has higher compression fracture strength than a convention contact lens and is not easily broken (JP-A4-67117). In the above method, however, it is required to carry out a polymerization so as to attain a uniform polymerization not only by controlling the polymerization rate of monomers used but also by precisely controlling polymerization conditions. It is therefore very difficult to control the polymerization conditions.

There is also proposed a methods in which a non-crosslinked polymer formed by polymerizing monomers containing at least one monomer selected from an unsaturated carboxylic acid, an unsaturated carboxylate ester or an unsaturated carboxylic acid anhydride is compression-molded under heat in the presence of a polyamine, to produce a transparent optical resin molded article improved in solvent resistance and mechanical strength (JP-A-7-62022). In the above method, the molded article obtained in excellent solvent resistance, free of optical strains, homogeneous and excellent in transparency since a non-crosslinked powdery polymer is crosslinked in the presence of polyaminde during the compression molding under heat, and further, it undergoes almost no change of a form with the passage of time since the internal stress generated in the polymer after the molding is very small. However, due to a diversity of base curves of hard contact lenses and due to a variety of diopters and a variety of diameters, the above method has a defect that the number of molds therefor increases and that it requires immense labor to manage them.

Further, there is proposed a method in which a contact lens material is compression-molded under heat to produce a contact optical molded article (JP-A-60-49906 and JP-A-61-41118). In this method, a film having a weight of a molded article to be produced and having a uniform thickness is punched out or cut, and the resultant piece is place between dies having convex surfaces correspond to the form of a molded article or dies having convex and concave surfaces and a re-molded under pressure at a temperature higher than the glass transition temperature of a thermoplastic material used but lower than the melt-flowing temperature thereof, to produce a contact optical molded article. In the above method, however, a film-shaped non-processed produce which is formed of a thermoplastic resin having no crosslinked structure and has a weight equivalent to the weight of a molded article is molded to a finished form, and the molded article obtained has a problem that the form thereof changes with the passage of time or that the strength thereof is not sufficient since it has no crosslinked structure.

Supplying oxygen to cornea wearing a contact lens naturally alleviates a physiological burden on the cornea, and it is said that the deficiently of oxygen in cornea has a clinically large influence. A contact lens is required to secure sufficient safety for a long period of time since it is to be in direct contact with a living tissue, cornea, which is highly sensitive and essential for the function of vision. Further, since cornea constantly requires oxygen for maintaining transparency, a composition of monomers to be contained, or the like, is devised for increasing the DK value. However, when the DK value is increased, there is caused a problem that the durability decreases. Further, copolymers which are improved in durability strength by adding a strength-imparting monomer or a crosslinked agent are available, while they cannot be said to be satisfactory.

DISCLOSURE OF THE INVENTION

Under the circumstances, it is a first object of the present invention to provide a process for efficiently producing a gas-permeable hard contact lens which is improved in durability strength, is free of optical strains and has no problem on wearing.

It is a second object of the present invention to provide a gas-permeable hard contact lens which is improved in durability strength, is free of optical strains and has no problem on wearing.

For achieving the above objects, the present inventors have made diligent studies and as a result have found that the above first object can be achieved by hot press-stretching a crosslinked gas-permeable hard contact lens material and then machining it.

Further, it has been found that the second object can be achieved by a gas-permeable hard contact lens obtained by the above process and a gas-permeable hard contact lens formed of a crosslinked gas-permeable hard contact lens material which is hot press-stretched so as to have a compression ratio and a compression-flexure fracture strength in specific ranges.

The present invention has been made on the basis of the above findings.

That is, the present invention provides:
(1) a process for the production of a gas-permeable hard contact lens, which comprises hot press-stretching a crosslinked gas-permeable hard contact lens material and then machining the press-stretched material,
(2) a gas-permeable hard contact lens obtained by the above process (1), and
(3) a gas-permeable hard contact lens formed of a crosslinked gas-permeable hard contact lens material which is not press-stretched to have a compression ratio of 5 to 50% and a compression-flexure fracture strength of 300 to 1,500 g.

BRIEF DESCRIPTION OF DRAWINGS

The figures are partial schematic views of different examples of heat press-stretching apparatus used for practicing the process of the present invention.

BEST MODES FOR PRACTICING THE INVENTION

In the process for the production of a hard contact lens provided by the present invention, a crosslinked gas-permeable hard contact lens material is used as a material. The lens material is not specially limited, and it can be properly selected from known lens materials conventionally used for gas-permeable hard contact lenses. The above crosslinked gas-permeable hard contact lens material is preferably a lens material formed of a copolymer containing fluorine-containing (meth)acrylate and silicon-containing (meth)acrylate as main components and containing a crosslinking monomer, a hydrophilic monomer and a siloxane oligomer having a polymerizable functional group in a molecular terminal. In the present invention, "(meth)acrylate" stands for acrylate or methacrylate.

The above fluorine-containing (meth)acrylate preferably include fluoroalkyl (meth)acrylates such as 2,2,2-trifluoroethyl (meth)acrylate, 2,2,2,2',2',2'-hexafluoroisopropyl (meth)acrylate, 2,2,3,3,4,4,4-heptafluorobutyl (meth)acrylate, 2,2,3,3,4,4,5,5,6,6,7,7,8,8,8-pentadecafulorooctyl (meth)acrylate and 2,2,3,3,4,4,5,5,6,6,7,7,8,8,9,9-hexadecafluorononyl (meth)acrylate. Of these, fluoroalkyl methacrylates are preferred. These fluorine-containing (meth)acrylates may be used alone or in combination.

The silicon-containing (meth)acrylate includes siloxanyl (meth)acrylates such as tris(trimethylsiloxy)silylpropyl (meth)acrylate, heptamethyltrisiloxanylethyl (meth)acrylate, pentamethyldisiloxanyl (meth)acrylate, isobutylhexamethyltrisiloxanyl (meth)acrylate, methyldi(trimethylsiloxy)-(meth)acryloxymethylsilane, n-propyloctamethyltetrasiloxanylpropyl (meth)acrylate, pentamethyldi(trimethylsiloxy)-(meth)acryloxymethylsilane and t-butyltetramethyldisiloxanylethyl (meth)acrylate, and further includes trimethylsilyl (meth)acrylate and phenyldimethylsilylmethyl (meth)acrylate. Of these, siloxanyl (meth)acrylates are preferred, and siloxanyl methacrylates are particularly preferred. These silicon-containing (meth)acrylates may be used alone or in combination.

The above fluorine-containing (meth)acrylate and the above silicon-containing (meth)acrylate have a high effect on improving the oxygen permeability of a copolymer, and when these two (meth)acrylates are used in combination, there can be obtained a copolymer having desired oxygen permeability. The oxygen permeability of the copolymer can be adjusted by adjusting the mixing ratio of these two (meth)acrylates.

The content ratio of a fluorine-containing (meth)acrylate unit:silicon-containing (meth)acrylate unit in the copolymer differs depending upon desired oxygen permeability. Generally, the weight ratio thereof is in the range of from 70:30 to 40:60, preferably in the range of from 60:40 to 50:50.

The crosslinking monomer includes alkylene glycol di(meth)acrylates such as ethylene glycol di(meth)acrylate and diethylene glycol di(meth)acrylate, and difunctional or higher monomers such as trimethylolpropane tri(meth)acrylate and pentaerythritol tetra- or tri(meth)acrylate. These crosslinking monomers may be used alone or in combination. The above crosslinking monomer has an effect on imparting the copolymer with hardness and chemical resistance.

The content of the crosslinking monomer in the above copolymer is generally in the range of from 0.1 to 20% by weight.

The hydrophilic monomer includes hydroxyl-group-containing (meth)acrylates such as 2-hydroxyethyl (meth)acrylates, 2-hydroxypropyl (meth)acrylate and 2-hydroxybutyl (meth)acrylate, unsaturated carboxylic acids such as acrylic acid, methacrylic acid, itaconic acid, fumaric acid, maleic acid and sinnamic acid, (meth)acrylamides such as acrylamide, methacrylamide, dimethylacrylamide and dimethylacrylamide, vinylpyridine and vinylpyrrolidone. These hydrophilic monomers may be used alone or in combination. The above "(meth)acrylamides" stand for acrylamides or methacrylamides.

When used as a comonomer, the above hydrophilic monomer has the effect of improving the copolymer in wetting properties, and it improves a lens in its affinity to tears when the lens is worn so that it improves the wearing feeling. An unsaturated carboxylic acid is particularly preferred since it has remarkable effects on improving the copolymer in hardness and improving the copolymer in wetting properties.

The content of the above hydrophilic monomer unit in the copolymer is generally in the range of from 5 to 20% by weight.

The siloxane oligomer having a polymerizable functional group in a molecular terminal is used for improving the copolymer in impact resistance. For example, it is preferred to use a compound of the general formula (I), (I)

wherein m is an integer of 5 to 200, and each of A and A' is a group of the general formula, in which R is hydrogen atom or methyl, and may be the same as the other or different from the other.

The above siloxane oligomer preferably has a molecular weight in the range of from approximately 500 to 15,000, and isophorone diisocyanate-based siloxane oligomer [oligomer of the general formula (I) in which A and A' are groups represented by (b)] is preferred due to its remarkable effect of improving the impact resistance.

The content of the above siloxane oligomer component in the copolymer is generally in the range of from 0.1 to 15% by weight.

The crosslinked gas-permeable hard contact lens material used in the present invention can be prepared, for example, by a method shown below.

A polymerization initiator such as azobisisobutyronitrile, azobisdimethylvaleronitrile, benzoyl peroxide or lauroyl peroxide preferably in an amount of 0.05 to 1% by weight is added to, and mixed with, a monomer mixture containing the above fluorine-containing (meth)acrylate, silicon-containing (meth)acrylate, crosslinking monomer, hydrophilic monomer and siloxane oligomer, and then, the resultant mixture is poured into a casting container formed of a metal, plastic or glass and polymerized under heat after the container is closed, to prepare a circular button-shaped or rod-shaped crosslinked gas-permeable hard contact lens material. For the polymerization, ultraviolet polymerization may be employed beside the heat polymerization.

In the process of the present invention, the above-prepared circular button-shaped or rod-shaped contact lens material (to be sometimes abbreviated as "button material" or "rod material" hereinafter) is hot press-stretched so as to have a thickness smaller than the thickness the material has before press-stretched. The thickness after the stretch-pressing may be a magnitude of the button material or the rod material that can be processed in a general hard contact lens processing step, while it is preferably a magnitude in which the compression ratio is 5 to 50%. The compression ratio is calculated on the basis of the following equation.

Compression ratio (%)=[(Height (mm) of material before compression−height (mm) of material after compression)/height (mm) of material before compression ]×100

Although differing depending upon contact lens materials, the button material or the rod material during the hot press-stretching generally has a temperature in the range of from 100 to 140° C.

The method of the hot press-stretching will be explained below.

Figure 1:
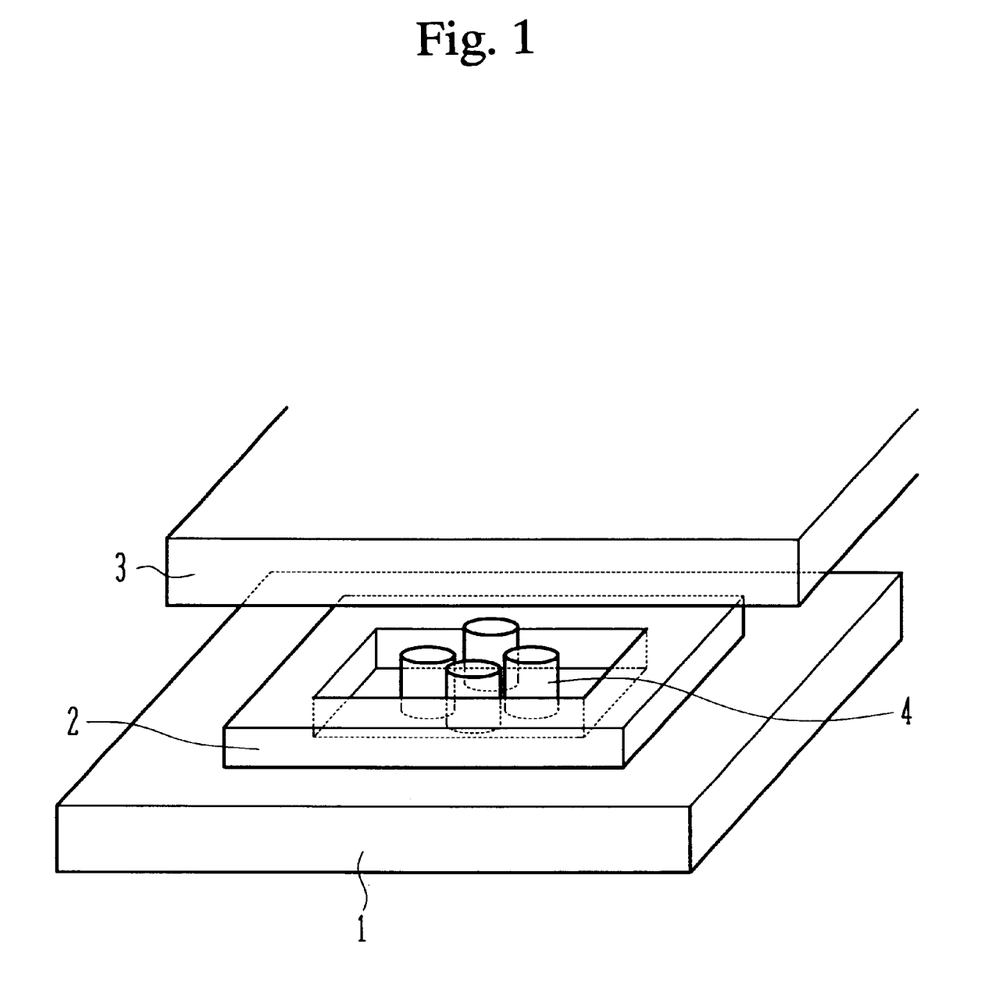
FIG. 1 illustrates a press for heat press-stretching a button-shaped contact lens material.

When the contact lens material is a button material, the hot press-stretching can be carried out, for example, with an apparatus shown in FIG. 1.

FIG. 1 shows a partial schematic view of one example of an apparatus for hot press-stretching a button material. First, a plate-shaped jig 2 for adjusting a compression height, which has a space portion having a thickness adjusted depending upon a compression ratio, is set on a press lower plate 1, a button material 4 having a predetermined height dimension is placed in the space portion of the jig 2, then, a press upper plate is lowered until it reaches a top surface of the button material 4, heating is carried out for a predetermined period of time, and further, the button material 4 is press-stretched by applying pressure, whereby the press upper plate 3 is lowered until it reaches the top end surface of the plate-shaped jig 2, the material is processed to have a height depending upon a compression ratio, and an intended hot press-stretched material can be obtained.

When the plate-shaped jig having the space portion has a constant thickness, the height of the button material is adjusted depending upon a compression ratio, and similar procedures are carried out, whereby an intended hot press-stretched material is obtained.

Figure 2:
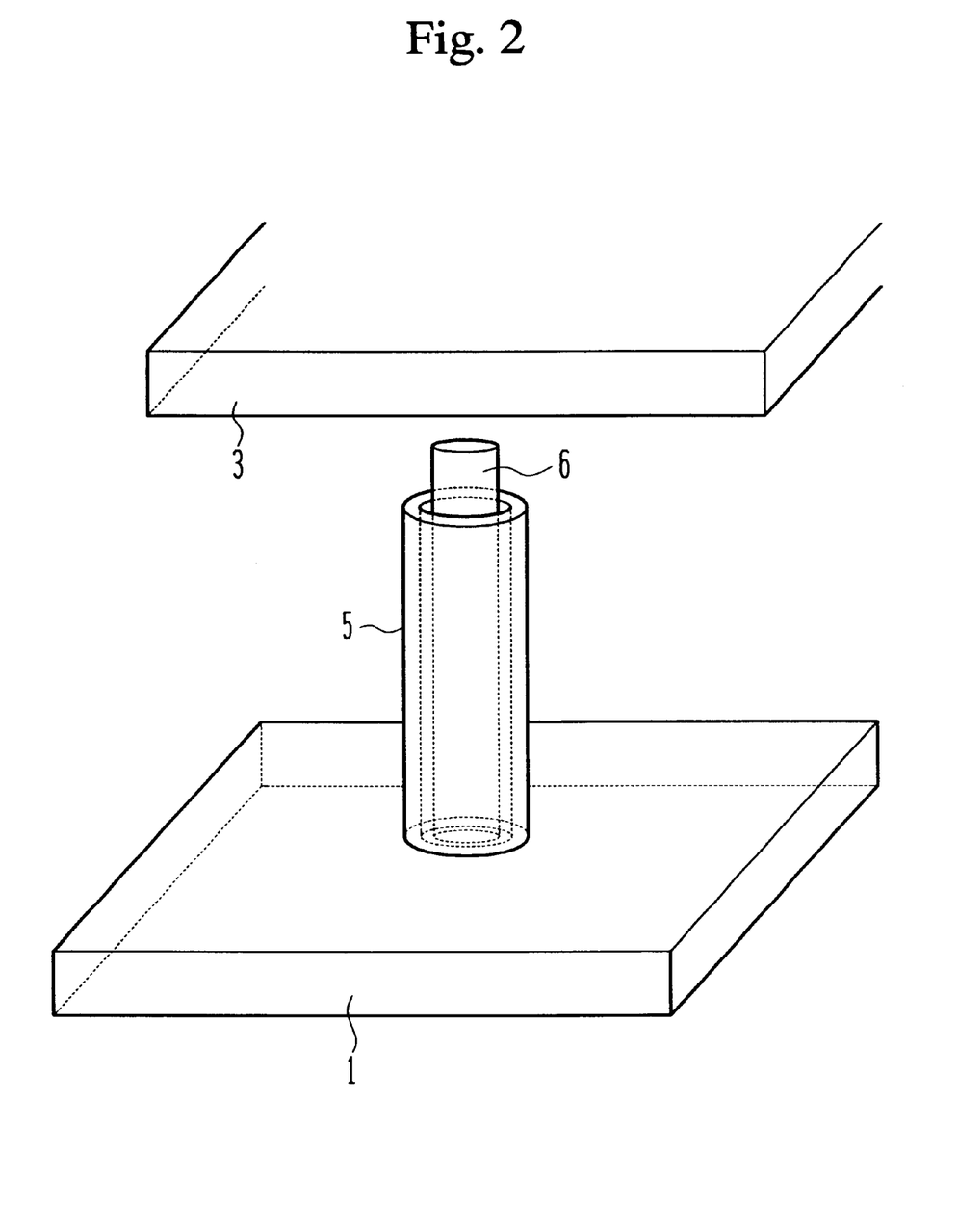
FIG. 2 illustrates a press for heat press-stretching a rod-shaped contact lens material.
Figure 3:
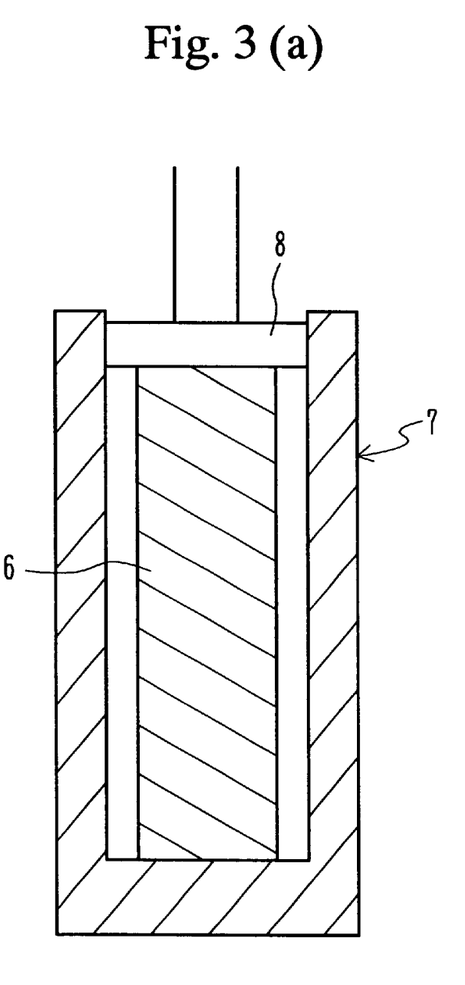
FIG. 3(a) is a cross-section of a rod-shaped contact lens material in a jig in contact with a press member before heat press-stretching.
FIG. 3(b) is a cross-section of a rod-shaped contact lens material during heat press stretching.

When the contact lens material is a rod material, the hot press-stretching can be carried out, for example, with an apparatus shown in FIG. 2 or 3.

FIG. 2 shows a partial schematic view of one example of an apparatus for hot press-stretching a rod material. First, a cylindrical jig 5 for adjusting a compression height is set on a press lower plate 1, a rod material 6 is placed in the center of the jig 5, then, a press upper plate 3 is lowered until it reaches the top end surface of the rod material 6, heating is carried out for a predetermined period of time, and further, the rod material 6 is press-stretched by applying pressure, whereby the press upper plate 3 is lowered until it reaches the upper end surface of the cylindrical jig 5, and an intended hot press-stretched material is obtained. In this case, when a cylindrical jig having a constant inner diameter is used, it is required to adjust the outer diameter and height of the rod material such that the outer diameter of the hot press-stretched material equals the inner diameter of the cylindrical jig. When a rod material having a fixed outer diameter and a fixed height is used, it is required to adjust the inner diameter and height of the cylindrical jig such that the outer diameter of the hot press-stretched material equals the inner diameter of the cylindrical jig.

FIG. 3 shows a partial schematic view of another example of the apparatus for hot press-stretching a rod material. First, a rod material 6 is placed in the hollow portion of a cylindrical (hollow column-shaped) jig 7, and then, a press member 8 is lowered until it reaches the upper end surface of the rod material 6 [(a)]. Then, the jig 8 is heated to maintain the rod material 6 at a predetermined temperature, and the press member 8 is lowered such that the rod material 6 has a predetermined compression ratio [(b)]. Thereafter, while the press-stretching is controlled so as to show a predetermined pressure, the rod material 6 is maintained at the above temperature for a predetermined period of time, and then the jig 7 is cooled by a cooling method such as air-cooling with a fan, to cool the compressed rod material to a temperature near room temperature. Then, the compressed rod material is taken out of the jig 7, to give an intended hot press-stretched material. It is required to adjust the inner diameter of the above jig or the diameter of the rod material such that the outer diameter of the hot press-stretched material equals the inner diameter of the cylindrical jig at a predetermined compression of ratio.

Then, the thus hot press-stretched crosslinked gas-permeable hard contact lens material is machined, e.g., cut and polished, to give a gas-permeable hard contact lens improved in durability strength. The method of machining such as cutting and polishing is not specially limited, and a method generally practiced in the production of a conventional hard contact lens can be employed.

When the above circular button-shaped or rod shaped contact lens material is hot press-stretched, the hot press-stretched material has optical strains in some cases. However, the hot press-stretched material is cut and polished as described above, whereby there can be obtained a gas-permeable hard contact lens which is free of optical strains and excellent in transparency and of which the internal stress is small and the durability strength is high.

Further, the present invention provides a gas-permeable hard contact lens obtained by the above production process. Generally, the gas-permeable hard contact lens obtained by the above process has a compression ratio in the range of from 5 to 50% and a compression-flexure fracture strength in the range of from 300 to 1,500 g.

The above compression-flexure fracture strength refers to a value measured in the following compression-flexure flexure strength test using a universal tester model 4310 supplied by Instron Co. A sample contact lens is fixed to upper and lower anvils with water drops, and when the anvil was lowered at a constant rate (200 mm/minute), the contact lens is measured for a compression-flexure fracture strength (g).

Further, the present invention also provides a gas-permeable hard contact lens formed of a crosslinked gas-permeable hard contact lens material which is hot press-stretched to have the above properties, i.e., a compression ratio of 5 to 50% and a compression-flexure fracture strength of 300 to 1,500 g.

The present invention will be explained further in detail with reference to Examples hereinafter, while in present invention shall not be limited by these Examples.

EXAMPLE 1

A monomer mixture containing 43 parts by weight of 2,2,2-trifluoroethyl methacrylate, 43 parts by weight of tris(trimethylsiloxane)-γ-methyacryloxypropylsilane, 2 parts by weight of a siloxane oligomer having a polymerizable functional group in a molecular terminal, 8 parts by weight of methacrylic acid, 2 parts by weight of dimethylacrylamide, 2 parts by weight of ethylene glycol dimethacrylate as a crosslinking agent and 0.25 part by weight of azobisisobutyronitrile as a polymerization initiator was polymerized in a pipe formed of polyethylene having an inner diameter of 15 mm, to prepare a crosslinked gas-permeable contact lens material.

Then, the above contact lens material was centerless ground, and button-shaped materials ("button materials" hereinafter) each having a height adjusted to have a compression ratio of 5, 10, 15, 20 ,25 or 50% were prepared with a hydraulic lathe, Then, each button material having the above adjusted height was hot press-stretched with an apparatus shown in FIG. 1 as follows.

First, a button material 4 was placed in a space portion of a 5.7 mm thick plate-shaped jig 2 for adjusting a compression height set on a press lower plate 1, then, a press upper plate 3 was lowered so as to sandwich the button material, the button material was heated to 120° C. and maintained at the same temperature for 30 minutes. Then, the button material was compression-stretched with a pressure of 25 kg/cm$^2$, and while the pressure of 25 kg/cm$^2$ was maintained, water was circulated in the apparatus to cool the compression-stretched material to room temperature. Then, the pressure was released, the press upper plate 3 was elevated, and the hot stretched material was taken out.

In the above manner, press-stretched crosslinked gas-permeable hard contact lens materials each having a compression ratio of 5, 10, 15, 30, 25 or 50% were obtained.

Table 1 shows relationships between heights and diameters of these materials before the press-stretching and those after the press-stretching at each compression ratio.

TABLE 1

| Compression ratio of button material (%) | Before press-stretching (mm) | | After press-stretching (mm) | |
|---|---|---|---|---|
| | Height of button material | Diameter of button material | Height of button material | Diameter of button material |
| 5 | 6.00 | 14.00 | 5.70 | 14.4 |
| 10 | 6.33 | | | 14.8 |
| 15 | 6.71 | | | 15.2 |
| 20 | 7.13 | | | 15.7 |
| 25 | 7.60 | | | 16.2 |
| 50 | 11.40 | | | 19.8 |

(Height of plate-shaped jig 5.7 mm)

Then, each of the above materials was cut and polished to a give crosslinked gas-permeable hard contact lens having a thickness of approximately 0.15 mm.

EXAMPLE 2

A monomer mixture having the same composition as that used in Example 1 was polymerized in a pipe formed of a polyethylene having an inner diameter of 14, 15, or 16 mm, to prepare crosslinked gas-permeable contact lens materials. These contact lens materials were cut to give a rod-shaped material $\hat{1}$ having a diameter and a height of 14.0 mm and 66.7 mm, a rod-shaped material $\hat{2}$ having a diameter and a height of 15.0 mm and 72.6 mm or a rod-shaped material $\hat{3}$ having a diameter and a height of 16.0 mm and 63.8 mm ("rod materials" hereinafter).

Each rod material was hot press-stretched with an apparatus shown in FIG. 2 as follows.

First, the above rod material $\hat{1}$, $\hat{2}$ or $\hat{3}$ was placed in the center of a compression-height-adjusting cylindrical jig 5 set on a press lower plate 1, the cylindrical jig 5 having an inner diameter/a height of 17.0 mm/45.2 mm, 17.0 mm/56.5 mm or 17.0 mm/56.5 mm. Then, a press upper plate 3 was lowered until it reached the top end surface of the rod material 6 to sandwitch the rod material, and the rod material 6 was heated to 120° C. The rod material was maintained at the above temperature for 30 minutes. Then, the rod material was comppression-stretched with a pressure of 25 kg/cm², and while pressure of 25 kg/cm² was maintained, water was circulated in the apparatus to cool the compression-stretched material to room temperature. Then, the pressure was released, the press upper plate 3 was elevated, and the press-stretched material was taken out of the cylindrical jig 5.

In the above manner, press-stretched crosslinked gas-permeable hard contact lens materials each having a compression ratio of 11.4, 22.1 or 32.2% were obtained.

Table 2 shows relationships between heights and diameters of these materials before the press-stretching and those after the press-stretching at each compression ratio.

TABLE 2

| Compression ratio of rod material (%) | Before press-stretching (mm) | | After press-stretching (mm) | |
|---|---|---|---|---|
| | Height of rod material | Diameter of rod material | Height of rod material | Diameter of rod material |
| 11.4 | 63.8 | 16.0 | 56.5 | 17.0 |
| 22.1 | 72.6 | 15.0 | 56.5 | |
| 32.2 | 66.7 | 14.0 | 45.2 | |

Then, each of the above materials was cut and polished to give crosslinked gas-permeable hard contact lenses having a thickness of approximately 0.15 mm.

EXAMPLE 3

A monomer mixture having the same composition as that used in Example 1 was polymerized in a pipe formed of a polyethylene having an inner diameter of 13 mm, to prepare a crosslinked gas-permeable contact lens material. The contact lens material was cut to give a rod material having a diameter of 13 mm and a height of 500 mm.

The above rod material was not press-stretched with an apparatus shown in FIG. 3 as follows.

First, the above rod material 6 was placed in a hollow portion of a cylindrical jig 7 having an inner diameter of 14.5 mm, and then a press member 8 was lowered until it reached the top surface of the rod material 6. Then, the jig 7 was heated to increase the temperature of the rod material 6 to 120° C. in 20 minutes, and the rod was maintained at this temperature for 43 minutes. Then, the press member 8 was lowered at a rate of 100 mm/minute (approximately for 1 minute) until the rod material had a compression ratio of 20%. Thereafter, while the pressing pressure was controlled at 3 kgf/cm², the compressed rod material was maintained at 120° C. for approximately 2 minutes, and then air-cooled with a fan over approximately 5 hours until it had a temperature of 40° C. The above press-stretched material was taken out of the cylinder jig 7.

The above procedures gave a crosslinked gas-permeable hard contact lens material which was press-stretched to have a compression ratio of 20% and had an outer diameter of 14.5 mm and a height of 400 mm.

Then, the above material was cut and polished to give a crosslinked gas-permeable hard contact lens having a thickness of approximately 0.15 mm.

Comparative Example 1

A monomer mixture having the same composition as that used in Example 1 was polymerized to obtain a contact less material, and the contact lens material was cut and polished to prepare a crosslinked gas-permeable hard contact lens material without hot press-stretching it.

Test Example 1
Compression-flexure Fracture Strength Test and Observation of Fracture Form The press-stretched contact lens material having different compression ratios, obtained in Examples 1 and 2, the press-stretched contact lens material obtained in Example 3 and the press-stretching-free contact lens material obtained in Comparative Example 1 were processed to a contact lens form of BC 7.80, POW-3.00 and DIA 8.8, and the so-prepared contact lenses were subjected to the following compression-flexure fracture strength test with a universal tester model 4310 supplied by Instron Co.

That is, each contact lens was separately fixed to upper and lower amvils with water drops, and the anvil was lowered at a constant rate (200 mm/minute) to determine a compression-flexure fracture strength (g), a compression-flexure fracture deformation (mm), a compression-flexure fracture deformation ratio (%) and a compression flexural strength (g) at a 30% deformation. Further, each contact lens was observed for a fracture form.

Table 3 shows the results.

TABLE 3

| Sample | Comp. ratio (%) | Comp.-flexure fracture strength (g) | Comp.-flexure fracture deformation (mm) | Comp.-flexure fracture deformation ratio (%) | Comp. flexural strength at 30 % deformation (g) | Observation of fracture form |
|---|---|---|---|---|---|---|
| CEx. 1 | — | 224.1 | 6.10 | 69.3 | 65.6 | Divided to pieces |
| Ex. 1 | 25 | 1,303.0 | 8.27 | 93.9 | 66.0 | Divided to 2–3 pieces |
| | 50 | 1,413.0 | 8.32 | 94.5 | 63.4 | Not divided, cracked |
| Ex. 2 | 11.4 | 655.7 | 7.98 | 90.7 | 66.3 | Divided to 2–6 pieces |
| | 22.1 | 1,280.0 | 8.23 | 93.6 | 67.5 | Divided to 2–4 pieces |
| | 32.2 | 1,403.0 | 8.20 | 93.2 | 69.3 | Divided to 2–4 pieces |
| Ex. 3 | 20 | 900 | 7.83 | 89.0 | 71.8 | Not divided |

Comp. = Compression,
Ex. = Example,
CEx. = Comparative Example

As shown in Table 3, there are great differences observed in the compression-flexure fracture strength depending upon whether the hot press-stretching is carried out of not. With an increase in the compression ratio, the compression-flexure fracture strength increases.

With an increase in the compression ratio and with an increase in the compression-flexure fracture strength, the compression-flexure fracture deformation increases. This means that the distance until the lens is fractured increases when the anvil is lowered at a constant rate, and it is therefore assumed that the lens deflection increases.

It is assumed that the above tendency is produced because the molecular chains of the crosslinked gas-permeable contact lens materials come to have an oriented molecular structure by the hot press-stretching.

Test Example 2

Oxygen Permeability Measurement

The press-stretch contact lens materials having different compression ratios, obtained in Example 1, and the press-stretching-free contact lens material obtained in Comparative Example 1 were processed into a disk form having a diameter of 14 mm and a thickness of 0.25 mm, and the so-prepared disks were measured for degrees of oxygen permeability with a Seika-ken film oxygen permeation meter K316 supplied by Rika Seiki Kogyo, K.K., and measure values are shown in terms of electric current values. A higher current value shows better oxygen permeability. Table 4 shows the results.

TABLE 4

| Sample | Compression ratio (%) | Thickness (mm) | Current value ($\mu$A) | Ratio to Comparative Example 1 |
|---|---|---|---|---|
| CEx. 1 | — | 0.25 | 43.9 | — |
| Ex. 1 | 5 | 0.25 | 44.9 | 1.018 |
|  | 10 | 0.24 | 44.7 | 0.973 |
|  | 15 | 0.25 | 43.9 | 1.000 |
|  | 20 | 0.25 | 43.9 | 1.000 |
|  | 25 | 0.25 | 43.9 | 1.000 |
|  | 50 | 0.26 | 40.1 | 0.946 |

Ex. = Example,
CEx. = Comparative Example

As shown in Table 4, it is seen that the press-stretched contact lens materials having a compression ratio of 5 to 25% have almost the same oxygen permeability as that of the press-stretching-free contact lens material.

Test Example 3

Observation of Optical Strains

The press-stretched contact lens materials having different compression ratios, obtained in Examples 1 and 2, and lens-shaped articles prepared by mechanically processing these materials were respectively observed for optical strains through a stereoscopic microscope with a polarizer by a crossed Nicol prism method, and the materials and articles were evaluated on the basis of the following ratings. Table 5 shows the results.

TABLE 5

| Compression | Example 1 | | | | | | Example 2 | | |
|---|---|---|---|---|---|---|---|---|---|
| ratio (%) | 5 | 10 | 15 | 20 | 25 | 50 | 11.4 | 22.1 | 32.2 |
| Material | ○ | x | x | x | x | x | x | x | x |
| Lens | ⊚ | ⊚ | ⊚ | ⊚ | ⊚ | ⊚ | ⊚ | ⊚ | ⊚ |

⊚ No optical strain is observed.
○ A slight optical strain is observed.
x An optical strain is easily observed.

The contact lens materials showed radial optical strains when they had a compression ratio of 10% or more. However, the lenses obtained by cutting and polishing the press-stretched materials showed no optical strains.

Test Example 4

Stability Test

The press-stretched contact lens having a compression ratio of 5, 25, or 50%, obtained in Example 1 and, the press-stretching-free contact lens obtained in Comparative Example 1 were respectively inserted in in wet-lens cases filled with a storage solution, and they were stored at room temperature for 1 month and in a constant-temperature constant-humidity chamber (supplied by Kusumoto Kasei K.K.) under conditions of 40° C. of temperature and 70% of humidity for 2 months. Then, the lenses were measured for changes of base curves, diopters and thicknesses with the passage of time, and these were compared with their initial values. Further, the above contact lenses were respectively observed for optical strains through a stereoscopic microscope with a polarizer by a crossed Nicol prism method before and after the test.

Tables 6 and 7 show the results.

TABLE 6

| Sample | Comp. ratio (%) | Items measured or observed | Initial value | After 1 month | Amount of change |
|---|---|---|---|---|---|
| CEx. 1 | — | Base curve (mm) | 7.81 | 7.81 | 0 |
|  |  | Diopter (D) | −3.19 | −3.23 | −0.04 |
|  |  | Thickness (mm) | 0.161 | 0.159 | −0.002 |
|  |  | Optical strains | No | No | No |
| Ex. 1 | 5 | Base curve (mm) | 7.82 | 7.81 | 0.01 |
|  |  | Diopter (D) | −3.42 | −3.47 | −0.05 |
|  |  | Thickness (mm) | 0.148 | 0.145 | −0.003 |
|  |  | Optical strains | No | No | No |
|  | 25 | Base curve (mm) | 7.82 | 7.83 | 0.01 |
|  |  | Diopter (D) | −3.32 | −3.30 | 0.02 |
|  |  | Thickness (mm) | 0.155 | 0.155 | 0 |
|  |  | Optical strains | No | No | No |
|  | 50 | Base curve (mm) | 7.81 | 7.81 | 0 |
|  |  | Diopter (D) | −2.67 | −2.69 | −0.02 |
|  |  | Thickness (mm) | 0.165 | 0.165 | 0 |
|  |  | Optical strains | No | No | No |

Comp. ratio = Compression ratio,
CEx. = Comparative Example,
Ex. = Example,
(Stored at room temperature for 1 month)

TABLE 7

| Sample | Comp. ratio (%) | Items measured or observed | Initial value *1 | After 1 month *2 | After 2 months *3 | Amount of change |
|---|---|---|---|---|---|---|
| CEx. 1 | — | Base curve (mm) | 7.81 | 7.81 | 7.80 | −0.01 |
|  |  | Diopter (D) | −3.23 | −3.20 | −3.25 | −0.02 |
|  |  | Thickness (mm) | 0.159 | 0.161 | 0.158 | −0.001 |
|  |  | Optical strains | No | No | No | No |
| Ex. 1 | 5 | Base curve (mm) | 7.81 | 7.83 | 7.82 | 0.01 |
|  |  | Diopter (D) | −3.47 | −3.44 | −3.47 | 0 |
|  |  | Thickness (mm) | 0.145 | 0.149 | 0.148 | 0.003 |
|  |  | Optical strains | No | No | No | No |
|  | 25 | Base curve (mm) | 7.83 | 7.82 | 7.81 | −0.02 |
|  |  | Diopter (D) | −3.30 | −3.32 | −3.31 | −0.01 |

TABLE 7-continued

| Sample | Comp. ratio (%) | Items measured or observed | Initial value *1 | After 1 month *2 | After 2 months *3 | Amount of change |
|---|---|---|---|---|---|---|
| | 50 | Thickness (mm) | 0.155 | 0.156 | 0.153 | −0.002 |
| | | Optical strains | No | No | No | No |
| | | Base curve (mm) | 7.81 | 7.80 | 7.79 | −0.02 |
| | | Diopter (D) | −2.69 | −2.69 | −2.70 | −0.01 |
| | | Thickness (mm) | 0.165 | 0.164 | 0.164 | −0.001 |
| | | Optical strains | No | No | No | No |

*1 Results after storage at room temperature for 1 month (results after storage for 1 month in Table 6)
*2 Results after storage at room temperature for 1 month and further in an environment having a temperature of 40° C. and a humidity of 70% for 1 month.
*3 Results after storage at room temperature for 1 month and further in an environment having a temperature of 40° C. and a humidity of 70% for 2 months.
Comp. ratio = Compression ratio,
CEx. = Comparative Example,
Ex. = Example As shown in Tables 6 and 7, when the lens were stored at room temperature for 1 month or stored in an environment having a temperature of 40° C. and a humidity of 70% for 2 month, almost no changes were observed. Further, when the lenses were observed for optical strains, no generation of strains were found.

The results of the above stability test show that the gas-permeable hard contact lens of the present invention is a gas-permeable hard contact lens of which the internal stress is vary small.

EXAMPLES 4–6

A button-shaped contact lens material was prepared in the same manner as in Example 1 except that the amounts of monomers were changed as shown in Table 8, and then, the button material was not press-stretched in the same manner as in Example 1 to give a crosslinked gas-permeable hard contact lens material having a compression ratio of 5%, 25% or 50%.

Then, each of the above contact lens materials was processed into a lens form in the same manner as in Test Example 1, and each lens was tested for compression-flexure fracture strength. Table 9 shows the result.

TABLE 8

| | | Example 4 | Example 5 | Example 6 |
|---|---|---|---|---|
| Amount ratio (part by weight) | FMA | 43 | 47 | 50 |
| | SIMA | 43 | 30 | 25 |
| | MA | 5 | 10 | 10 |
| | DAA | 3 | 5 | 5 |
| | EDMA | 3 | 3 | 5 |
| | Siloxane oligomer | 3 | 5 | 5 |

(Notes)
FMA: 2,2,2-trifluoroethyl methacrylate
SIMA: tris(trimethylsiloxane)-γ-methacryloxypropylsilane
MA: mthacrylic acid
DAA: Dimethylacrylamide
EDMA: Ethylene glycol dimethacrylate
Siloxane oligomer: siloxane oligomer having a polymerizable functional group in a molecular terminal.

TABLE 9

| | Compression ratio (%) | Compression-flexure fracture strength (g) |
|---|---|---|
| Example 4 | 5 | 558.0 |
| | 25 | 1,009.0 |
| | 50 | 1,323.7 |
| Example 5 | 5 | 340.1 |
| | 25 | 1,059.0 |
| | 50 | 1,363.8 |
| Example 6 | 5 | 443.6 |
| | 25 | 1,015.0 |
| | 50 | 1,339.7 |

Industrial Utility

According to the process of the present invention, there can be efficiently produced a gas-permeable hard contact lens which is free of optical strains, excellent in transparency, of which the internal stress is small and further which has no problem on wearing and is improved in durability strength.

What is claimed is:

1. A process for the production of a gas-permeable hard contact lens obtained by heat polymerization or ultraviolet polymerization, which comprises hot press-stretching a crosslinked gas-permeable hard contact lens material and then machining the press-stretched material.

2. The process of claim 1, wherein the crosslinked gas-permeable hard contact lens material is a copolymer formed from a fluorine-containing (meth)acrylate and a silicon-containing (meth)acrylate as main components.

3. The process of claim 2, wherein the fluorine-containing (meth)acrylate is fluoroalkyl methacrylate.

4. The process of claim 2, wherein the silicon-containing (meth)acrylate is siloxanyl methacrylate.

5. The process of claim 2, wherein the copolymer has a fluorine-containing (meth)acrylate unit:silicon-containing (meth)acrylate unit content ratio of 70:30 to 40:60 by weight.

6. The process of claim 2, wherein the crosslinked gas-permeable hard contact lens material is a copolymer which further contains a crosslinked monomer component.

7. The process of claim 6, wherein the copolymer has a crosslinking monomer unit content of 0.1 to 20% by weight.

8. The process of claim 2, wherein the crosslinked gas-permeable had contact lens material is a copolymer which further contains a hydrophilic monomer component.

9. The process of claim 8, wherein the copolymer has a hydrophilic monomer unit content of 5 to 20% by weight.

10. The process of claim 2, wherein the crosslinked gas-permeable hard contact lens material is a copolymer which further contains a siloxane oligomer component having a polymerizable functional group in a molecular terminal.

11. The process of claim 10, wherein the siloxane oligomer having a polymerizable functional group in a molecular terminal is a compound of the general formula (I), (I)

wherein m is an integer of 5 to 200, and each of A and A' is a group of the general formula, in which R is a hydrogen atom or methyl, and may be the same as the other of different from the other.

12. The process of claim 10, wherein the copolymer contains 0.1 to 15% by weight of the siloxane oligomer component having a functional group in a molecular terminal.

13. The process of claim 1, wherein the crosslinked gas permeable hard contact lens material has the form of a circular button or a rod and is not press-stretched to have a thickness smaller that a thickness which the crosslinked gas-permeable hard contact lens material has before it is hot press-stretched.

14. The process of claim 13, wherein the hot press-stretched is carried out to attain a compression ratio of 5 to 50%.

15. The process of claim 13, wherein the crosslinked gas-permeable hard contact lens material having the form of a circular button or a rod has a temperature of 100 to 140° C. during the hot press-stretching.

16. A gas-permeable hard contact lens obtained by the process recited in claim 1.

17. The gas-permeable hard contact lens of claim 16, which has a compression ratio of 5 to 50% and a compression-flexure fracture strength of 300 to 1,500 g.

18. A gas-permeable hard contact lens formed of a crosslinked gas-permeable hard contact lens material which is hot press-stretched to have a compression ratio of 5 to 50% and a compression-flexure fracture strength of 300 to 1,500 g.

19. The gas-permeable hard contact lens of claim 18, wherein the crosslinked gas-permeable hard contact lens material is a copolymer formed from a fluorine-containing (meth)acrylate and a silicon-containing (meth)acrylate as main components.

20. A process for the production of a gas-permeable hard contact lens, which comprises hot press-stretching a crosslinked gas-permeable hard contact lens material, wherein the crosslinked gas-permeable hard contact lens material has the form of a circular button or a rod and is hot press-stretched to attain a compression ratio of 5 to 50% to have a thickness smaller than a thickness which the crosslinked gas-permeable hard contact lens material has before being hot press-stretched, and thereafter machining the press-stretched material.

* * * * *